(12) United States Patent  
Paczkowski et al.

(10) Patent No.: US 9,191,388 B1  
(45) Date of Patent: Nov. 17, 2015

(54) TRUSTED SECURITY ZONE COMMUNICATION ADDRESSING ON AN ELECTRONIC DEVICE

(71) Applicant: Sprint Communications Company L.P., Overland Park, KS (US)

(72) Inventors: Lyle W. Paczkowski, Mission Hills, KS (US); William M. Parsel, Overland Park, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

(21) Appl. No.: 13/844,145

(22) Filed: Mar. 15, 2013

(51) Int. Cl.
*H04L 29/06* (2006.01)

(52) U.S. Cl.
CPC .................................... *H04L 63/10* (2013.01)

(58) Field of Classification Search
CPC ......... H04L 63/20; H04L 63/08; H04L 63/10; H04L 29/06; H04L 63/0428
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 6,131,024 A | 10/2000 | Boltz | |
| 6,177,860 B1 | 1/2001 | Cromer et al. | |
| 6,219,712 B1 | 4/2001 | Mann et al. | |
| 6,363,150 B1 | 3/2002 | Bhagavath et al. | |
| 6,477,180 B1 | 11/2002 | Aggarwal et al. | |
| 6,507,904 B1 | 1/2003 | Ellison et al. | |
| 6,614,893 B1 | 9/2003 | Paiz | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,043,241 B1 | 5/2006 | Sladek et al. | |
| 7,366,806 B2 | 4/2008 | Milenkovic et al. | |
| 7,387,240 B2 | 6/2008 | Ziegler | |

(Continued)

FOREIGN PATENT DOCUMENTS

WO WO2011025433 A1 3/2011
WO WO2012064171 A1 5/2012

(Continued)

OTHER PUBLICATIONS

FAIPP Pre-Interview Communication dated Oct. 24, 2012, U.S. Appl. No. 13/463,797, filed May 3, 2012.

(Continued)

*Primary Examiner* — Carl Colin
*Assistant Examiner* — Ghodrat Jamshidi

(57) ABSTRACT

A method of communicating with a computing device having a trusted security zone comprises mapping a unique identifier for a computing device with a trust zone access control (TZAC) address, composing a message comprising the trust zone access control address, and routing the message to the computing device based on the unique identifier. The computing device comprises a normal security zone and a trusted security zone that is separate from the normal security zone, and the trust zone access control address is a unique identifier associated with a hardware component of the trusted security zone within the computing device. The message is internally routed to the trusted security zone within the computing device using on the trust zone access control address.

19 Claims, 8 Drawing Sheets

(56) References Cited

U.S. PATENT DOCUMENTS

| | | |
|---|---|---|
| 7,519,824 B1 | 4/2009 | Peyravian et al. |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 2001/0041591 A1 | 11/2001 | Carroll |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1* | 10/2004 | Hara ............................ 380/270 |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1* | 11/2006 | Sajassi et al. .................. 370/399 |
| 2006/0258289 A1 | 11/2006 | Dua |
| 2006/0259790 A1* | 11/2006 | Asokan et al. ................. 713/194 |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0005794 A1 | 1/2008 | Inoue et al. |
| 2008/0014867 A1 | 1/2008 | Finn |
| 2008/0022374 A1 | 1/2008 | Brown et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1* | 5/2008 | Natarajan et al. ............. 713/193 |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |

(56) References Cited

U.S. PATENT DOCUMENTS

| | | |
|---|---|---|
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1* | 6/2010 | Safa ................................. 726/3 |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1* | 6/2012 | Leung et al. ................... 370/252 |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1* | 8/2012 | Davis ............................ 370/392 |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1* | 2/2013 | Saroiu et al. ...................... 726/1 |
| 2013/0054474 A1 | 2/2013 | Yeager |

(56) References Cited

U.S. PATENT DOCUMENTS

| | | | |
|---|---|---|---|
| 2013/0062417 | A1 | 3/2013 | Lee et al. |
| 2013/0067552 | A1 | 3/2013 | Hawkes et al. |
| 2013/0074067 | A1 | 3/2013 | Chowdhry |
| 2013/0086385 | A1 | 4/2013 | Poeluev |
| 2013/0086684 | A1 | 4/2013 | Mohler |
| 2013/0097302 | A9 | 4/2013 | Khedouri et al. |
| 2013/0097657 | A1 | 4/2013 | Cardamore et al. |
| 2013/0105565 | A1 | 5/2013 | Kamprath |
| 2013/0109307 | A1 | 5/2013 | Reisgies et al. |
| 2013/0111095 | A1* | 5/2013 | Mehrotra et al. ............ 710/301 |
| 2013/0117186 | A1 | 5/2013 | Weinstein et al. |
| 2013/0124583 | A1 | 5/2013 | Ferguson et al. |
| 2013/0125114 | A1 | 5/2013 | Frascadore |
| 2013/0136126 | A1* | 5/2013 | Wang et al. .................. 370/392 |
| 2013/0138521 | A1 | 5/2013 | Want et al. |
| 2013/0138959 | A1 | 5/2013 | Pelly et al. |
| 2013/0140360 | A1 | 6/2013 | Graylin |
| 2013/0143489 | A1 | 6/2013 | Morris et al. |
| 2013/0145429 | A1 | 6/2013 | Mendel et al. |
| 2013/0159021 | A1 | 6/2013 | Felsher |
| 2013/0159186 | A1 | 6/2013 | Brudnicki et al. |
| 2013/0159710 | A1 | 6/2013 | Khan |
| 2013/0160120 | A1 | 6/2013 | Malaviya et al. |
| 2013/0174147 | A1 | 7/2013 | Sahita et al. |
| 2013/0175984 | A1 | 7/2013 | Yamazaki et al. |
| 2013/0191632 | A1 | 7/2013 | Spector et al. |
| 2013/0212704 | A1 | 8/2013 | Shablygin et al. |
| 2013/0262264 | A1 | 10/2013 | Karstoft |
| 2013/0263212 | A1 | 10/2013 | Faltyn et al. |
| 2013/0290709 | A1 | 10/2013 | Muppidi et al. |
| 2013/0305333 | A1 | 11/2013 | Katzer et al. |
| 2013/0310003 | A1 | 11/2013 | Sadhvani et al. |
| 2013/0332456 | A1 | 12/2013 | Arkin |
| 2013/0343181 | A1 | 12/2013 | Stroud et al. |
| 2013/0345530 | A1 | 12/2013 | McRoberts et al. |
| 2013/0347064 | A1 | 12/2013 | Aissi |
| 2013/0347103 | A1 | 12/2013 | Veteikis et al. |
| 2014/0007182 | A1 | 1/2014 | Qureshi et al. |
| 2014/0007222 | A1 | 1/2014 | Qureshi et al. |
| 2014/0033316 | A1 | 1/2014 | Paczkowski et al. |
| 2014/0047548 | A1 | 2/2014 | Bye et al. |
| 2014/0059642 | A1 | 2/2014 | Deasy et al. |
| 2014/0074508 | A1 | 3/2014 | Ying et al. |
| 2014/0089243 | A1 | 3/2014 | Oppenheimer |
| 2014/0089699 | A1 | 3/2014 | O'Connor et al. |
| 2014/0104287 | A1 | 4/2014 | Nalluri et al. |
| 2014/0106709 | A1 | 4/2014 | Palamara et al. |
| 2014/0141718 | A1 | 5/2014 | Stromberg et al. |
| 2014/0155025 | A1 | 6/2014 | Parker et al. |
| 2014/0173747 | A1 | 6/2014 | Govindaraju |
| 2014/0188738 | A1 | 7/2014 | Huxham |
| 2014/0215196 | A1 | 7/2014 | Berlin |
| 2014/0245444 | A1 | 8/2014 | Lutas et al. |
| 2014/0254381 | A1 | 9/2014 | Racz Sandor et al. |
| 2014/0267332 | A1 | 9/2014 | Chhabra et al. |
| 2014/0279558 | A1 | 9/2014 | Kadi et al. |
| 2014/0281544 | A1 | 9/2014 | Paczkowski et al. |
| 2014/0298026 | A1 | 10/2014 | Isozaki et al. |
| 2015/0106805 | A1 | 4/2015 | Melander et al. |
| 2015/0169885 | A1 | 6/2015 | Paczkowski et al. |
| 2015/0172928 | A1 | 6/2015 | Katzer et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | W02014158431 A1 | 10/2014 |

OTHER PUBLICATIONS

Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.

(56) References Cited

OTHER PUBLICATIONS

Paczkowski, Lyle W., et al., Enablement of a Trusted Security Zone Authentication for Remote Mobile Device Management Systems and Methods, filed Mar. 15, 2013, U.S. Appl. No. 13/844,357.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al., "Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.

(56) References Cited

OTHER PUBLICATIONS

Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13151750, filed on Jul. 24, 2013.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Notice of Allowance dated May 29, 2015, U.S. Appl. No. 14/085,474, filed Nov. 20, 2013.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

(56) References Cited

OTHER PUBLICATIONS

Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp. jsp?tp=&arnumber= 1617569.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug., 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.

* cited by examiner

TRUSTED SECURITY ZONE COMMUNICATION ADDRESSING ON AN ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices in the future are expected to store or embody a variety of applications that may interact with confidential information such as credit card numbers, bank account numbers, authentication numbers, personal data, medical information, and the like. Additionally, mobile communication devices may promote users installing after market applications that may be infiltrated by malware such as viruses, trojans, screen scrapers, keyboard monitors, and other nefarious software and/or firmware.

SUMMARY

In an embodiment, a method of communicating with a computing device having a trusted security zone comprises mapping an identifier for a computing device with a trust zone access control (TZAC) address, composing a message comprising the trust zone access control address, and routing the message to the computing device based on the identifier. The computing device comprises a normal security zone and a trusted security zone that is separate from the normal security zone, and the trust zone access control address is a unique identifier associated with a hardware component of the trusted security zone within the computing device. The message is internally routed to the trusted security zone within the computing device using on the trust zone access control address.

In an embodiment, a method of communicating over a network comprises receiving a message at a computing device, internally providing the message to the trusted security zone based on the trust zone access control address, and processing the message within the trusted security zone. The message comprises a routing address and a trust zone access control address, and the routing address comprises information configured to route the message to the computing device. The trust zone access control address is a unique identifier associated with a hardware component of a trusted security zone within the computing device.

In an embodiment, a computing device comprises a modem, a trust zone access control address encoded into at least one of the processor or the memory, and a processor having a trusted security zone and a normal security zone, a trusted security zone application, that when executed on the processor, configures the processor to block access by other applications executing in the normal security zone of the processor from accessing a memory, reading inputs, and writing outputs while the trusted security zone application executes in the trusted security zone. The trust zone access control address is a unique identifier associated with the at least one of the processor or the memory.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
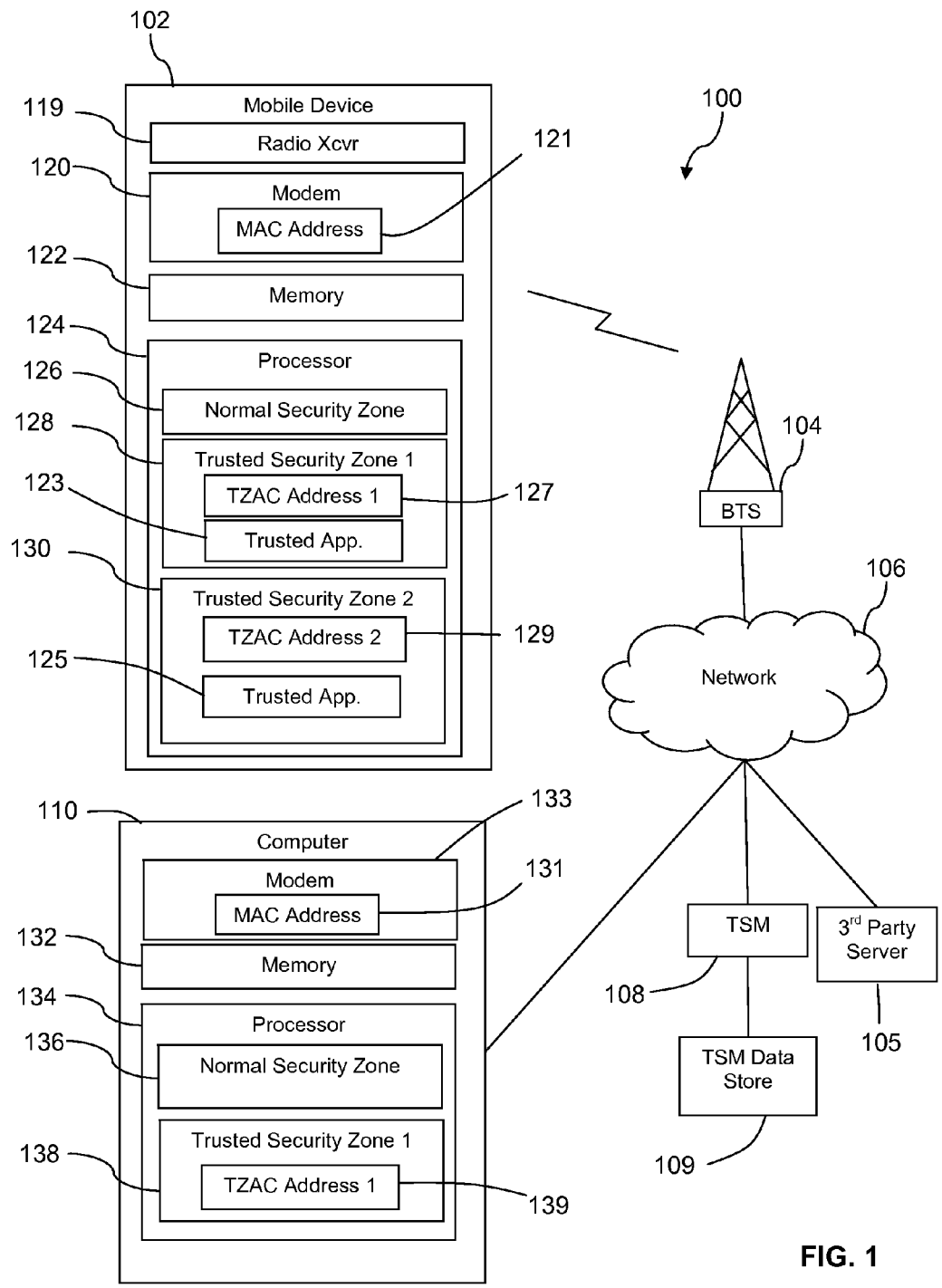
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A computing device or electronic device having a trusted security zone that comprises a Trust Zone Access Control (TZAC) address associated with a hardware component of the trusted security zone is described. The computing device can be a mobile device such as a mobile phone, a personal digital assistant, a media player, or other. The computing device may be a desktop computer, a laptop computer, a notebook computer, or other computer. The computing device may be embedded inside another system, for example in a printer, in a biometric measurement device, in an automobile dashboard (e.g., a head unit and/or telemetrics unit), in a communication system component, or any other system having a processor and performing a computing function. The computing device may be coupled to a network by a wireless link and/or by a wired link.

The computing device may be manufactured by an original equipment manufacturer with a processor having a normal security zone and a trusted security zone. In some contexts, the normal security zone may be referred to as a normal partition. The trusted security zone may operate in a secure mode that prevents communication with any outside processes. The execution of the trusted security zone within the secure mode may make communication with applications and components of the trusted security zone difficult, if not impossible, which is an intended result of the trusted security zone architecture. However, it may be desirable to communicate with the trusted security zone to modify a setting, modify an application, or add or remove various software components remotely. In order to communicate with and/or access the trusted security zone remotely, a network on which the computing device is operating may desirably be able to locate and/or reference the trusted security zone on the network.

In order to make the trusted security zone locatable, addressable, and/or accessible, the trusted security zone may be provided with a TZAC address. For example, the TZAC address may be supplied by the manufacturer during construction of the computing device. The TZAC address may comprise a unique identifier assigned to the trusted security zone for the computing device and may be assigned to one or more physical components of the trusted security zone. The TZAC address may allow a communication to be sent to the trusted security zone, and the communication can be protected using one or more security techniques such as encryption. The TZAC address may be protected and known only by a network provider, thereby providing further security for maintaining the integrity of the trusted security zone.

When a plurality of trusted security zones operate on a computing device, each of the trusted security zones may have a TZAC address to allow selective communication with each trusted security zone. For example, the different trusted security zones may be associated with different credit card accounts, different banking accounts, and different interface and application packs. A financial institution can modify the account information and/or the interface and application packs by sending a communication through a network service provider. The network service provider can associate the TZAC address of the trusted security zone with the communication and forward the communication to the appropriate trusted security zone associated with the corresponding TZAC address. Based on the communication, changes can be made to the information and/or interface packs within the trusted security zone. The ability to direct communications to one or more trusted security zones may improve the ability to update the trusted security zone information and applications remotely.

A trusted security zone provides chipsets with a hardware root of trust, a secure execution environment for applications, and secure access to peripherals. For example, the trusted security zone may provide a secure execution environment for trusted application 123 executing in the trusted security zone 128 and trusted application 125 executing in trusted security zone 120 of FIG. 1. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main computing device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

While the trusted security zone is not open to users for installing applications or altering the trusted security zone information, a communication with a suitable level of trust can be used to alter the information in the trusted security zone such as various settings, information, application interfaces, and/or application packs. For example, a communication generated by a trusted source that is communicated with the appropriate layers of trust may be directed to the trusted security zone, accepted by the trusted security zone, and be allowed to execute and alter the trusted security zone. Such communications may be passed using a trusted end-to-end communication link documenting a continuity of trust.

Turning now to FIG. 1, a communication system 100 is described. In an embodiment, the system 100 comprises a mobile device 102, a base transceiver station (BTS) 104, a network 106, a trusted service manager server computer 108, a trusted service manager data store 109, and a computer 110. The communication system 100 can also include a third-party server 105 that may be in communication with the network 106 and/or the trusted server managers server 108. It is understood that the system 100 may comprise any number of mobile devices 102, any number of base transceiver stations 104, any number of trusted service manager servers 108 and associated data stores 109, any number of third-party servers 105, and/or any number of computers 110. The network 106 may comprise one or more public networks, one or more private networks, or a combination thereof.

The mobile device 102 comprises a radio transceiver 119, a modem 120, a memory 122, and a processor 124. The modem 120 is configured to send and receive communications over the radio transceiver 119, which is configured to establish a wireless communication link with the base transceiver station 104. The modem 120 may comprise a MAC address 121, which is a unique identifier associated with the hardware of the modem 120 that may be used to communicate using the network 106 according to one or more standards (e.g., IEEE 802 standards). The base transceiver station 104 may communicatively couple the radio transceiver 119 and/or the mobile device 102 to the network 106 and to devices that are connected to the network 106, for example the trusted service manager server 108. In an embodiment, the radio transceiver 119 and the base transceiver station 104 establish a wireless communication link according to one of a code division multiple access (CDMA) wireless protocol, a global system for mobile communication (GSM) wireless protocol, a long term evolution (LTE) wireless protocol, a worldwide interoperability for microwave access (WiMAX) wireless protocol, or another wireless communication protocol.

The processor 124 comprises a normal security zone 126 and one or more trusted security zones 128, 130. Under some circumstances, the processor 124 may periodically or occasionally switch between execution in the normal security zone 126 and execution in one or more of the trusted security zones 128, 130 to check for any pending operations. For example, when executing in the trusted security zone 128, the processor 124 may pause execution in the trusted security zone 128, start execution in the normal security zone 126, and check if any tasks are pending attention in the normal security zone 126, for example receiving an email or an incoming text message. When the trusted security zone 128 is executing a sensitive operation the processor 124 may not switch to execute in the normal security zone 126 even if a periodic or scheduled switch interval occurs and may defer this switch until the sensitive operation being performed in the trusted security zone 128 is completed. While two trusted security zones 128, 130 are illustrated in FIG. 1, only one trusted security zone may be present, or more than two trusted security zones may be present. Also, although illustrated in FIG. 1 as separate, in an embodiment, the first trusted security zone 128 and the second trusted security zone 130 may be implemented as separate trusted containers within one trusted security zone or trusted partition.

The processor 124 may be any of a microprocessor, a digital signal processor (DSP), an application specific integrated circuit (ASIC), a field programmable gate array (FPGA), a complex programmable logic device (CPLD), or another type of processor. The processor 124 may comprise a plurality of individual processor chips. The processor 124 may comprise a single chip that encapsulates a plurality of independent logic processing units or processors, for example a dual-core processor or a quad-core processor. In an embodiment, one or more trusted security zones may be separately associated with each processor in a multi-processor device or each core of the processor in a multi-core processor. As described above, when the trusted security zone 128, 130 executes an application, the normal security zone 126 is prevented from executing applications. The memory 122 may store both normal applications and trusted applications, where trusted applications are authorized for executing in one or more of the trusted security zones 128, 130. Alternatively, the memory 122 may be segmented into a normal security portion and a trusted security portion, and the trusted applications may be stored in the trusted security portion of the memory 122.

Each of the trusted security zones 128, 130 may have a corresponding TZAC address 127, 129. The TZAC address 127, 129 may be a unique identifier assigned to the trusted security zone 128, 130 for the mobile device 102, and the TZAC address 127, 129 may be assigned to one or more physical components of the trusted security zone such as a hardware component on which the trusted security zone or trusted execution environment is operating. In this sense, the TZAC address 127, 129 may be similar to a MAC address associated with a physical network component, except that the TZAC address 127, 129 may remain hidden and non-discoverable. For example, the TZAC address 127, 129 may only be used to direct and/or allow a communication into the trusted security zone 128, 130 and may not be discoverable, for example, by being broadcast to the network 106 where it could be intercepted and used to hack into the trusted security zone 128, 130. The TZAC address 127, 129 may be unique to the hardware of the trusted security zone 128, 130 and may be encoded in the hardware (e.g., a processor executing the trusted security zone) by the manufacturer during production of the computing device such as the mobile device 102. In some embodiments, the TZAC address may be referred to as a burned-in TZAC address. The TZAC address 127, 129 may not be capable of being changed.

In an embodiment, the trusted security zones 128, 130 can be manufactured by an original equipment manufacturer of processor 124, for example a semiconductor manufacturer, to have the two trusted security zones 128, 130. While two trusted security zones 128, 130 are illustrated, any number of trusted security zones may be present in the mobile device 102, and one or more of the trusted security zones 128, 130 may have an associated TZAC address 127, 129. For example, a plurality of trusted security zones having corresponding TZAC addresses may be associated with a plurality of processors operating in a computing device and/or they may be associated with a plurality of processor cores in a multi-core processor operating in a computing device. The trusted security zones 128, 130 may be provisioned by the manufacturer with the trusted applications and a base layer of trusted security functionality or utilities. In an embodiment, the trusted security zones 128, 130 may execute the same or different trusted applications.

The computer 110 may comprise a memory 132, a processor 134, and a modem 133. The modem 133 may be associated with a MAC address 131 or other unique identifier. The processor 134 may comprise a normal security zone 136 and a trusted security zone 138. The trusted security zone 138 is associated with a TZAC address 139. The memory 132, the processor 134, the normal security zone 136, and the trusted security zone 138 are substantially similar to the corresponding structures of the mobile device 102 and will not be described separately herein. The main difference between the mobile device 102 and the computer 110 as it pertains to this disclosure is that the mobile device 102 is communicatively coupled to the network 106 by a wireless link and the computer 110 may be communicatively coupled to the network 106 by a wired link. In an embodiment, however, the computer 110 may be communicatively coupled to the network 106 by a wireless link, such as by a wireless link to an access point in a wireless local area network (WLAN) that is part of the network 106. It is to be understood that the structures and functions described with reference to the trusted security zones 128, 130 of the mobile device 102 apply equally to the trusted security zone 138 of the computer 110.

The trusted service manager server 108 may be associated with a network service provider, or any other entity responsible for directing communications to a trusted security zone 128, 130 using a TZAC address 127, 129, respectively. The trusted service manager server 108 may be configured to receive requests for communication with a trusted security zone 128, 130, 138, verify the authenticity of the requests, lookup a TZAC address in a data store 109, append or encode the TZAC address to the communication, and provide the communication to corresponding device, where the communication can be routed to the trusted security zone associated with the TZAC address. Since the TZAC addresses 127, 129 may not be discoverable on the mobile device 102 and/or the computer 110, a data store 109 may be used to maintain a list of the TZAC addresses corresponding to each computing device. Providing a single source of oversight for the TZAC addresses 127, 129 in the data store 109 may aid in maintaining the level of trust with communications containing the TZAC address 127, 129.

The data store 109 may maintain the TZAC addresses 127, 129 in a lookup table that associates the TZAC addresses 127, 129 with one or more identifiers for the corresponding device, such as the mobile device 102 or the computer 110. This may enable the appropriate routing of the communication to the corresponding device, at which point the TZAC address 127, 129, as a unique hardware identifier, may be used to route the communication to the corresponding trusted security zone 128, 129 within the device. In an embodiment, the TZAC address may be stored in a lookup table that may be stored in the data store 109 that associates the TZAC address with one or more unique identifier (e.g., a routing reference) for the computing device including, but not limited to, the MAC address of the modem or radio transceiver on the device, a mobile equipment identifier (MEID), a mobile station identifier (MSID), a mobile directory number (MDN), a network access identifier (NAI), an electronic serial number (ESN), an international mobile equipment identity (IMEI), a private IP address, a link layer address on a local area network, or any combination thereof.

Figure 2:
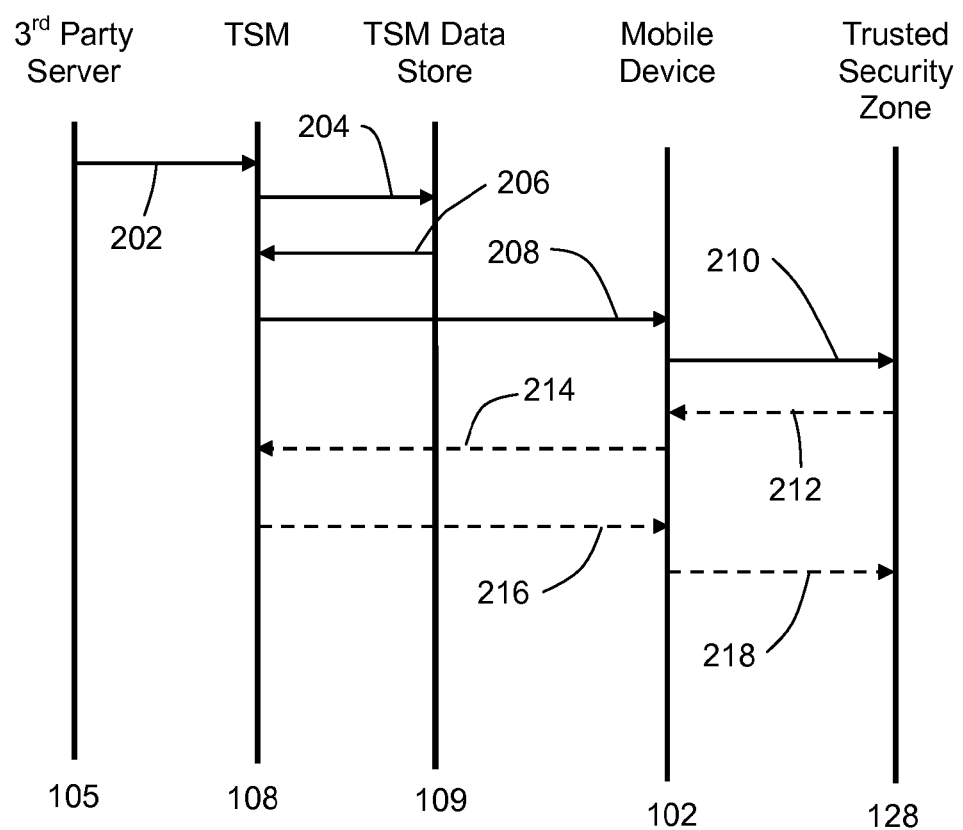
FIG. 2 is a chart illustrating a message flow according to an embodiment of the disclosure.

Referring to FIGS. 1 and 2, the system 100 may be used to provide communications between the network 106 and the mobile device 102 and/or the computer 110. While the remaining discussion is directed to the communications with the mobile device 102, it is to be understood that the communications with the computer 110 can be fully understood from the description of the communications with the mobile device 102. After the mobile device 102 is placed into service, a user may wish to provision additional information or an application into one or more of the trusted security zone 128. For example, a financial institution responsible for the third party server 105 may wish to provision a new financial interaction application into the first trusted security zone 128. The third party server 105 may send a request 202 with the new application and the identity of the mobile device 102 to the trusted service manager server 108 to provision the new application into the trusted security zone 128. The third party server 105 may identify the mobile device 102 using information provided by the use of the mobile device 102, such as a mobile directory number for the mobile device 102.

Upon receiving the request 202, the trusted service manager server 108 may send a request 204 to the data store 109 to obtain the TZAC address 127 of the trusted security zone 128. The request 204 may comprise the identity of the mobile device 102 obtained from the third party server 105. The data store 109 may perform a data lookup to correlate the identity of the mobile device 102 with the TZAC address 127 of the trusted security zone 128. The data store 109 may then return a response 206 comprising the TZAC address 127. In some embodiments, the network service provider may want to send a message to the trusted security zone 128 without receiving a request from a third party server 105. In such an embodiment, the communication routing may begin with the trusted service manager server 108 and may not involve a third party server 105.

The trusted service manager server 108 may then compose a message 208 comprising the new application encapsulated with the identity of the mobile device and the TZAC address 127. For example, the identity of the mobile device 102 or other routing information may be placed in a header of the message 208 along with the TZAC address 127. In order to further protect the information in the message 208 and the TZAC address 127, the message 208 may be encapsulated using one or more tokens or encryption keys useful for communicating the message through a chain of trusted security zone applications.

The trusted service manager server 108 may then send the message 208 to the mobile device 102 to provision the new application into the first trusted security zone 128, via the network 106, via the base transceiver station 104, and via the radio transceiver 119. Said in other words, the first trusted service manager server 108 may send the request via a radio communication link, and the mobile device 102 may receive the request via a radio communication link. The trusted service manager server 108 may transmit the request over a trusted end-to-end communication link from the trusted service manager server 108 to the mobile device 102. For further details about establishing trusted end-to-end communication links, see U.S. patent application Ser. No. 13/532,588, filed Jun. 25, 2012, entitled "End-to-end Trusted Communications Infrastructure," by Leo Michael McRoberts, et al., which was incorporated by reference in its entirety above. Upon receiving the message 208 at the radio transceiver 119, the modem 120 may be configured to recognize the TZAC address 127. A forwarding mechanism within the modem 120 may be used to accept the message 208 and redirect it as message 210 to the trusted security zone 128. The forwarding mechanism may involve extracting the TZAC address 127 from the message 208 and routing the message 210 over the appropriate physical components of the mobile device 102 to direct the message to the physical component associated with the TZAC address 127. For example, the forwarding mechanism may involve extracting the TZAC address 127 for a processor operating the trusted security zone 128, and transmitting the message 210 internally to the processor. The trusted security zone 128 and/or a trusted application executing within the trusted security zone 128 may receive the message 210 and perform one or more actions based on the message 210 such as provisioning the new application, changing a setting, storing information, and/or restoring, replacing, or removing one or more components from the trusted security zone 128.

While shown as single messages 202, 204, 206, 208, and 210, each message may comprise one or more messages and/or one or more portions of a single message.

The communication between the trusted service manager server 108 and the trusted security zones 128, 130 may be established in a number of ways. In an embodiment, the TZAC address 127 may be mapped to a public reference to the mobile device 102. The public address may be any indicia used to locate the mobile device 102 and send a communication to the mobile device 102 over a public communication network. For example, the TZAC address 127 may be mapped to a mobile station identifier (MSID). When a message is to be sent to the trusted security zone 128, the mobile station identifier may be used to locate the mobile device 102 on the public network and establish the appropriate routing protocols to send the message 208 to the mobile device 102. For example, the message 208 may be routed through the network 106 to the appropriate base station 104 in the cell in which the mobile device 102 is located. The message 208 may comprise the TZAC address 127, and when received by the modem 120, the modem 120 may pass the message 210 to the trusted security zone 128 based on the TZAC address 127. Any other indicia of the mobile device 102 may similarly be used to locate and route the message 208 to the mobile device 102, and subsequently, route the message 210 to the trusted security zone 128.

In an embodiment, the TZAC address 127 may be mapped to indicia on a private network. For example, the TZAC address 127 may be mapped to a private IP address associated with the modem 120 and/or radio transceiver 119 of the mobile device 102. The message 208 may be composed by the trusted service manager server 108 and comprise both the private IP address and the TZAC address 127. The private IP address may allow the message 208 to be routed over the network 106 and be directed to the mobile device 102. Upon being received by the mobile device 102, for example by the modem 120 in the mobile device 102, the TZAC address 127 may be used to internally route the message 210 to the trusted security zone 128. In an embodiment, the TZAC address 127 may be mapped to the MAC address 121 of the modem 120. The MAC address 121 may be sufficient on a private network to route the message 208 to the mobile device 102. The TZAC address 127 may form a separate hardware identifier or a sub-address of the modem 120 MAC address 121, thereby enabling the mobile device 102 to route the message 210 to the trusted security zone 128. Various other private network indicia may be used to route the message 208 to the trusted security zone 128 over a private network.

Still further, the TZAC address 127 may be mapped to indicia of a local area network. For example, the TZAC address 127 may form a portion of a link layer address or be mapped to a link layer address associated with the computer 110 coupled to the local area network. In this embodiment, the message 208 may be routed to the computer 110, for example the modem 133 of the computer 110, based on the link layer address mapped to the TZAC address. Upon being routed to the computer 110, the TZAC address may be used to internally route the message 210 to the trusted security zone 128.

In an embodiment, the provisioning of the trusted security zone 128 as described above may optionally be conducted in multiple communications between the trusted service manager server 108 and the trusted security zone 128. In a first step, the trusted service manager server 108 may provide the message to the trusted security zone 128 using the TZAC address 127 as described above with respect to requests and responses 202 through 210. Rather than provide the full information for provisioning the trusted security zone 128, the message may provide a key to the trusted security zone 128 and/or a trusted application executing in a trusted execution environment within the trusted security zone 128. The key may provide access to the trusted security zone 128. For example, the key may trigger the mobile device 102 to execute in the trusted security zone 128 where applications that are configured to execute in the normal security zone 126 are prevented from executing. When the trusted service manager server 108 has gained access to the trusted security zone 128, the trusted security zone 128 may optionally reply in a message 212 passing to the modem 120 and then in a message 214 to the trusted service manager server 108 indicating that access to the trusted security zone 128 has been granted. The optional reply message 212 may be useful to indicate the availability of the trusted security zone 128 on the mobile device 102 and/or the mode of operation of the mobile device 102 (e.g., operating in the trusted security zone 128). Alternatively, the trusted security zone 128 may await a further communication from the trusted service manager server 108. One or more of the messages 212, 214 may be transmitted over a trusted end-to-end communication link.

In a second step of provisioning, the trusted service manager server 108 may send a request 216 comprising the TZAC address 127 to the trusted security zone 128 including the trusted application and possibly additional data or information for installation in the trusted security zone 128 and/or in a portion of memory 122 allocated to the trusted security zone 128. One or more functions that are part of a base layer of trusted security functionality that may have been installed during original manufacturing of the processor 124 may perform this request. Alternatively, the base layer of trusted security functionality may be provisioned using an application contained in the message 210 during the first step of provisioning above. In this way, a trusted security zone 128 may be remotely provisioned after manufacturing.

The trusted security zones 128, 130 may be used to support a variety of trusted applications and/or storage of confidential information. The trusted security zones 128, 130 may be provisioned using the TZAC addresses 127, 129, respectively, to support various trusted applications and/or confidential information in the trusted security zones 128, 130 and/or in a portion of memory 122 dedicated to the trusted security zones 128, 130. For example, the trusted security zones 128, 130 may be provisioned to support credit card transactions by installing one or more trusted application associated with the credit card and confidential information such as credit card account numbers and/or credit card authentication numbers in the trusted security zones 128, 130 and/or in a portion of memory 122 dedicated to the trusted security zones 128, 130. The trusted security zones 128, 130 may be provisioned to support debit card transactions by installing a trusted application associated with the debit card and confidential information such as debit card account numbers and/or debit card personal identification number (PIN), and initializing an account funds balance in the trusted security zones 128, 130 and/or in a portion of memory 122 dedicated to the trusted security zones 128, 130. A trusted security zone 128, 130 may be provisioned to support presenting and/or storing medical records. A trusted security zone 128, 130 may be provisioned to present and/or to store a medical treatment regime. Various other trusted applications, settings, and/or information may be provisioned, removed, replaced, or restored using a communication based on the TZAC addresses 127, 129 to establish a communication link between a network 106 and a trusted security zone 128, 130.

The system 100 may comprise other computers or servers (e.g., third party server 105) coupled to the network 106 that may be associated with one or more of the trusted security zones 128, 130 and/or the trusted applications, for example a server associated with one or more interface and applications pack, a server associated with an enterprise persona, a server associated with a private persona, a server associated with a medical record repository or source, a server associated with a medical treatment monitoring system, or other servers. These other computers or servers may be involved in provisioning and monitoring the trusted application of the trusted security zone that they are responsible for, analogously to the trusted service manager server 108.

Figure 3:
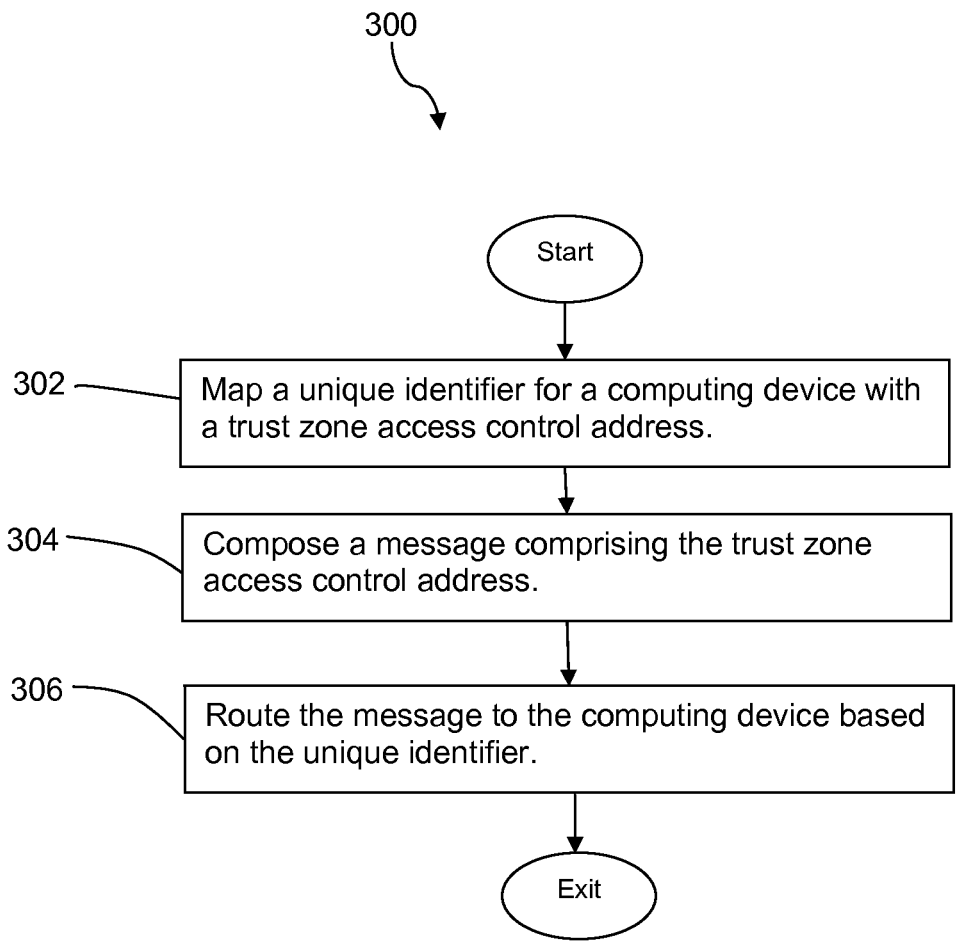
FIG. 3 is a flow chart of a method according to an embodiment of the disclosure.

Turning now to FIG. 3 and with reference to FIGS. 1 and 2, a method 300 is described. At block 302, an identifier for a computing device is mapped to a TZAC address 127. The computing device may have a normal security zone 126 and a trusted security zone 128, which is separate from the normal security zone 126. The identifier may be any public or private identifier for the computing device that allows the computing device to be located and messages transmitted to the computing device on a public or private network. In an embodiment, the TZAC address 127 may identify one of many trusted security zones 128, 130 on the computing device. In an embodiment, the identifier may be provided in a request from an outside server. In order to map the identifier with the TZAC address 127, the identifier may be sent to a data store 109 having a lookup or mapping table, the identifier may be correlated with the TZAC address 127 in the lookup or mapping table, and the TZAC address may be received from the data store 109.

At block 304, a message comprising the TZAC address 127 may be composed. The message may also comprise the identifier, which may be used to route the message to the computing device. In some embodiments, the identifier may be further mapped to another routing reference to allow the message to be sent to the computing device. For example, the identifier may be mapped to a public reference, a private IP address, a MAC address of the modem in the computing device, and/or a link layer address for a computing device coupled to a local area network. In some embodiments, the message may be encrypted or encapsulated with a token or encryption key.

At block 306, the message may be routed to the computing device based on the identifier. The message may then be internally routed to the trusted security zone 128 within the computing device using the TZAC address 127 in the message. In an embodiment, the identifier may be mapped to a separate routing reference. In this case, the message can be routed to the computing device using one or more portions of the routing reference, which is originally based on the mapping with the identifier. The message may be used to perform one or more actions within the trusted security zone 128. In some embodiments, the message may comprise a key that is used to gain access to the trusted security zone 128, for example, to trigger the execution of the trusted security zone 128. An optional response may be generated by the trusted security zone 128, for example, to verify the availability of the trusted security zone 128. A second message comprising data may then be composed. The second message may then be routed to the trusted security zone 128 based on the access, and the data may be used in any suitable manner by the trusted security zone 128.

Figure 4:
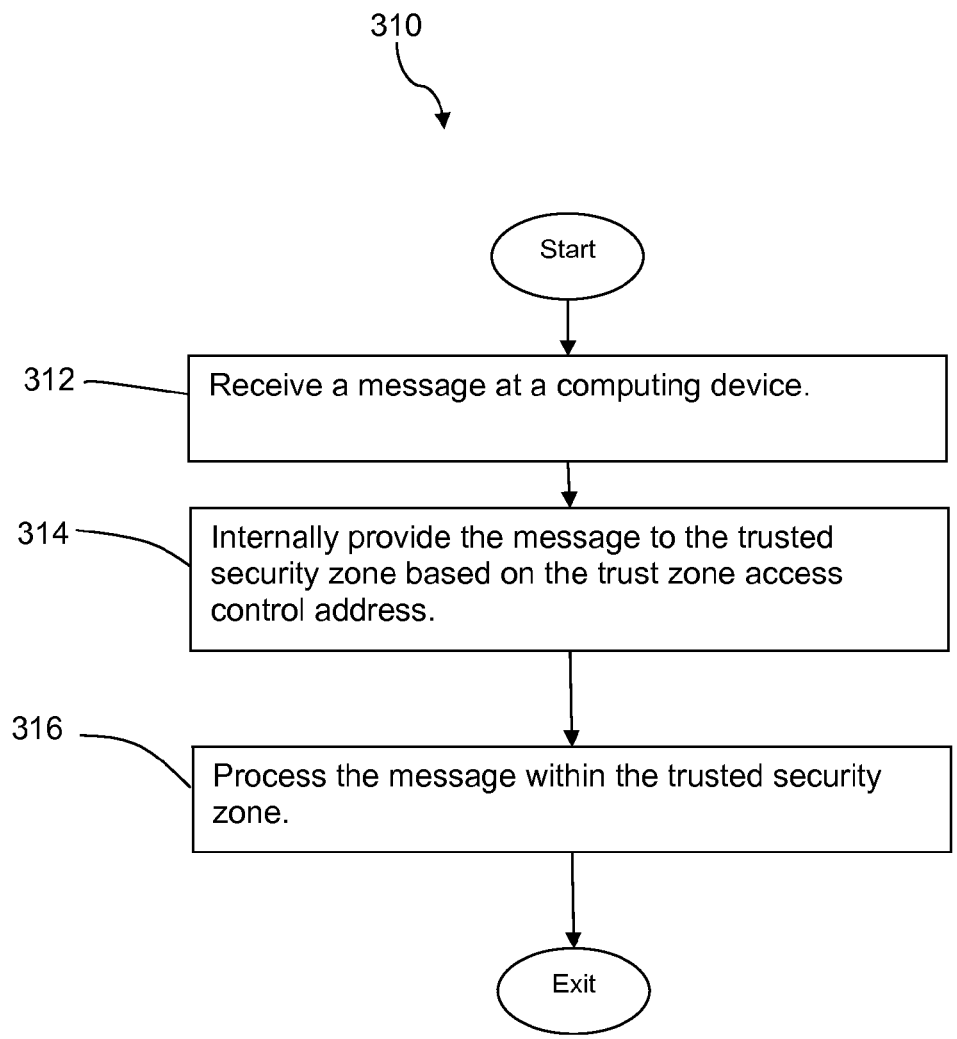
FIG. 4 is a flow chart of another method according to an embodiment of the disclosure.

Turning now to FIG. 4, a method 310 is described. At block 312, a message is received at a computing device. The message comprises a routing address for the computing device and a TZAC address 127. The routing address may form the basis for routing the message to the computing device, and the TZAC address 127 may form the basis for internally routing the message within the computing device. Since the TZAC address 127 can be a unique identifier associated with a hardware component of a trusted security zone 128 within the computing device, the TZAC address 127 may be used to route the message to the hardware component associated with the trusted security zone 128. In an embodiment, the TZAC address 127 may not be discoverable. The message received at the computing device may be encrypted and/or encapsulated using one more tokens or encryption keys. In some embodiments, the computing device comprises a modem, and the message may be received at the modem.

At block 314, the message is internally provided to the trusted security zone 128 based on the TZAC address 127. In an embodiment, the TZAC address 127 may not be discoverable, for example, the TZAC address 127 may not be broadcast on the network or send any response to a message sent to the trusted security zone 128 using the TZAC address 127. In this embodiment, the non-discoverable nature of the TZAC address 127 may form a layer of security by requiring that the message be addressed to the proper computing device and have the proper TZAC address 127 in order for the message to be internally provided to the trusted security zone 128. In an embodiment, the modem may serve to route the message to the trusted security zone 128 using the TZAC address 127. For example, the modem may extract the TZAC address 127 from the message and use the extracted TZAC address 127 to internally route the message to the trusted security zone 128.

At block 316, the message may be processed within the trusted security zone 128, which may be operating in trusted execution environment. In an embodiment, processing the message can include, but is not limited to, provisioning a new application in the trusted security zone 128, changing a setting in the trusted security zone 128, storing information in the trusted security zone 128, restoring information in the trusted security zone 128, replacing information in the trusted security zone 128, removing information from the trusted security zone 128, or any combination thereof.

Figure 5:
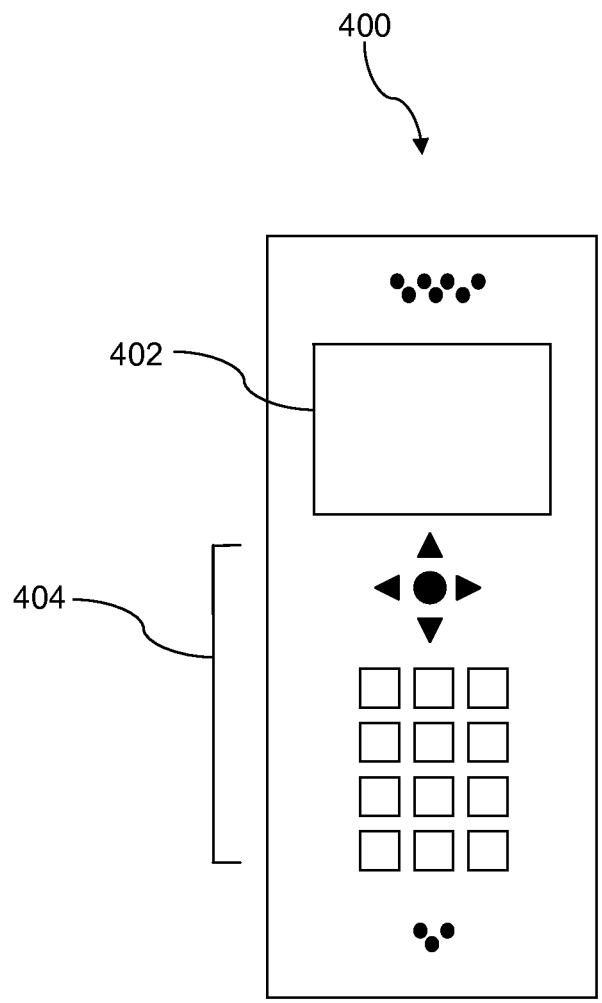
FIG. 5 is an illustration of a mobile communication device according to an embodiment of the disclosure.

FIG. 5 depicts a mobile device 400, which is operable for implementing aspects of the present disclosure, for example the mobile device 400, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
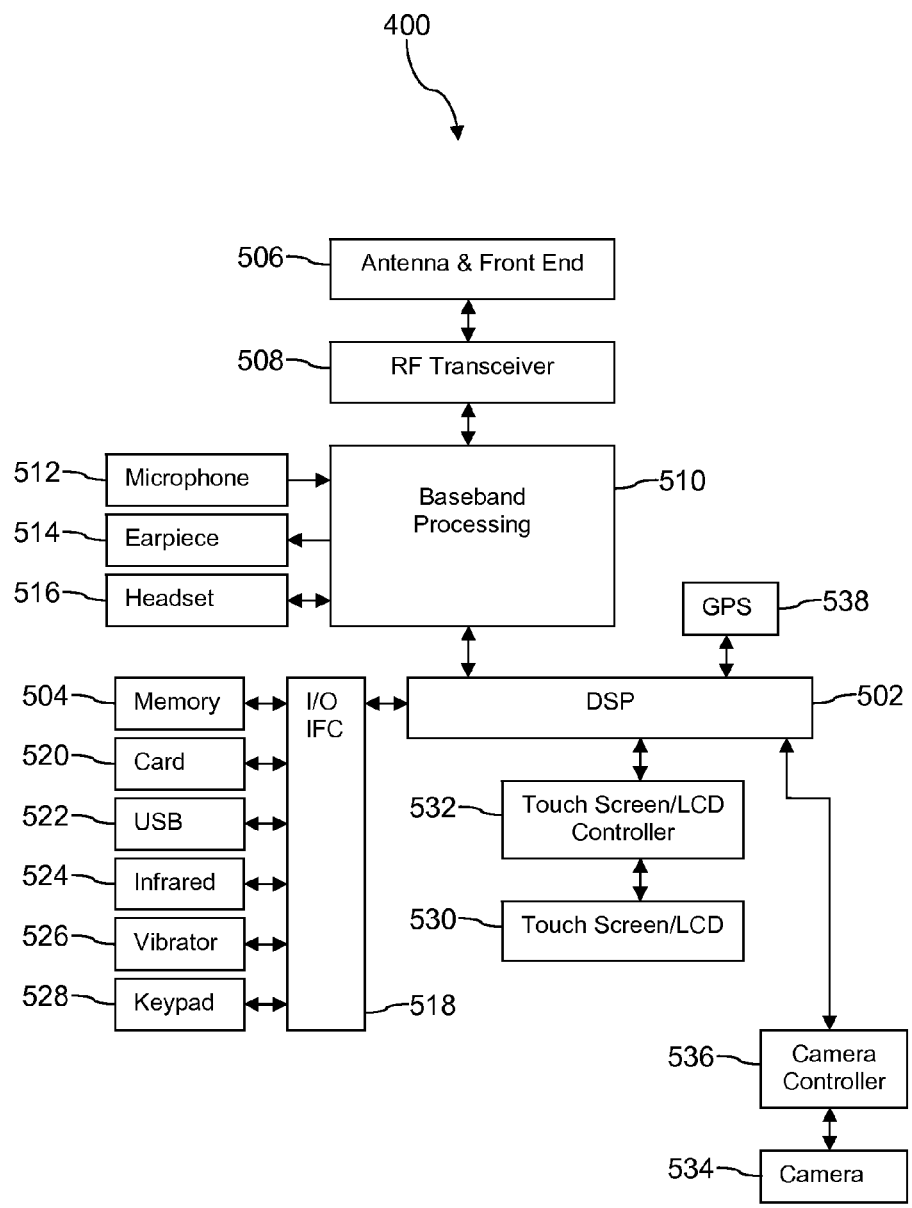
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
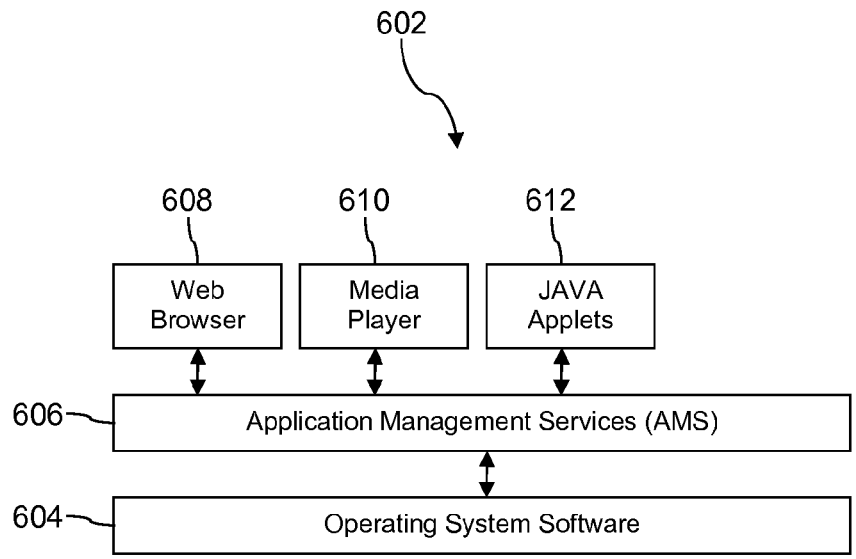
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
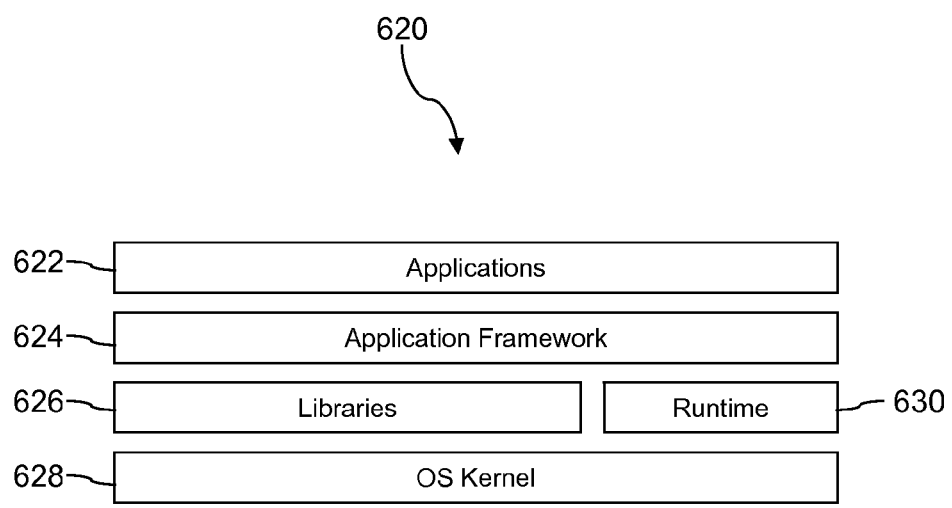
FIG. 7B is a block diagram of another software architecture according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
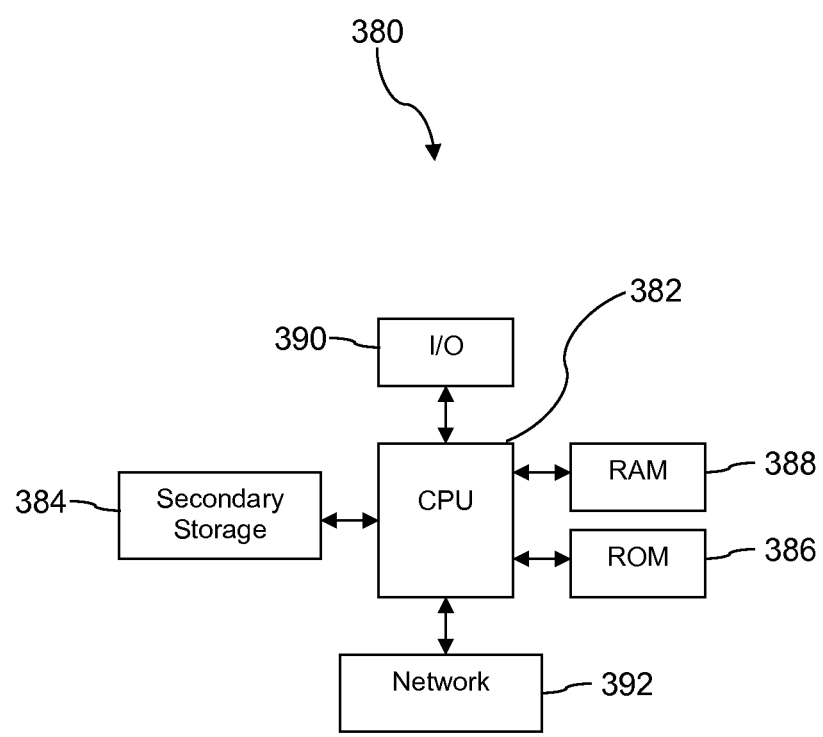
FIG. 8 is a block diagram of a computer system according to an embodiment of the disclosure.

FIG. 8 illustrates a computer system 380 suitable for implementing one or more embodiments disclosed herein, for example the computer 110 and the trusted service manager server 108. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicating with a computing device having a trusted security zone, the method comprising:

mapping a unique identifier for a computing device with a trust zone access control address, wherein the computing device comprises a normal security zone and a trusted security zone providing hardware assisted security that is separate from the normal security zone, wherein the trust zone access control address is unique to a hardware component of the trusted security zone within the computing device, and wherein when an application executes in the trusted security zone of the computing device, applications that are configured to execute in the normal security zone are prevented from executing on the computing device;

composing, by a source external to the computing device, a message comprising the trust zone access control address, wherein the trust zone access control address is not discoverable from the computing device, and wherein the trusted zone access control address is different from the unique identifier;

routing the message to the computing device based on the unique identifier, wherein the message is internally routed to the trusted security zone within the computing device using the trust zone access control address, and wherein the message is received by an application executing in the trusted security zone of the computing device;

providing a second message to a second application on the computing device executing in the trusted security zone subsequent to routing;

obtaining a response from the second application on computing device; and determining that the message was routed to the trusted security zone based on the response obtained from the second application.

2. The method of claim 1, wherein the computing device further comprises a plurality of trusted security zones and a plurality of trust zone access control addresses corresponding to each of the plurality of trusted security zones.

3. The method of claim 1, further comprising:
receiving a request to send a message to the trusted security zone on the computing device, wherein the request comprises the unique identifier for the computing device; and
verifying the request as being authorized to send to the computing device.

4. The method of claim 1, wherein mapping the unique identifier with a trust zone access control address comprises:
sending the unique identifier to a data store;
correlating the unique identifier with the trust zone access control address; and
receiving a response comprising the trust zone access control address.

5. The method of claim 1, wherein the unique identifier comprises at least one of: the MAC address of a modem or radio transceiver on the device, a mobile equipment identifier, a mobile station identifier, a mobile directory number, a network access identifier, an electronic serial number, an international mobile equipment identity, a private IP address, a link layer address on a local area network, or any combination thereof.

6. The method of claim 1, further comprising: mapping the unique identifier with a public reference for the computing device, wherein the message further comprises the public reference, and where the message is routed to the computing device using the public reference.

7. The method of claim 1, further comprising: mapping the unique identifier with a private IP address for the computing device, wherein the message further comprises the private IP address, and where the message is routed to the computing device using the private IP address.

8. The method of claim 1, further comprising: mapping the unique identifier with a link layer address for the computing device, wherein the message further comprises the link layer address, and where the message is routed to the computing device using the link layer address.

9. The method of claim 1, wherein the message further comprises a key, and wherein the method further comprises:
obtaining access to the trusted security zone using the key;
composing a second message comprising the trust zone access control address and data;
routing the second message to the computing device based on the unique identifier, wherein the second message is internally routed to the trusted security zone using the trust zone access control address, and wherein the data is provided to the trusted security zone based on the access to the trusted security zone.

10. The method of claim 1, wherein the application executing in the trusted security zone configures the processor to perform one or more of: provisioning a new application in the trusted security zone, changing a setting in the trusted security zone, storing information in the trusted security zone, restoring one or more components from the trusted security zone, replacing one or more components from the trusted security zone, or removing one or more components from the trusted security zone.

11. A method of communicating over a network, the method comprising:
receiving, from an external device, a message at a computing device, wherein the message comprises a routing address, a trust zone access control address, and a key, wherein the computing device comprises a normal security zone and a trusted security zone providing hardware assisted security that is separate from the normal security zone, wherein the routing address comprises information configured to route the message to the computing device, wherein the trust zone access control address is unique to a hardware component of the trusted security zone within the computing device, and wherein when an application executes in the trusted security zone of the computing device, applications that are configured to execute in the normal security zone are prevented from executing on the computing device;
internally providing the message to the trusted security zone based on the trust zone access control address, wherein the trust zone access control address is not discoverable from the computing device, and wherein the trust zone access control address is different from the routing address;
initiating an execution of an application within the trusted security zone of the computing device using the key;
preventing the execution of any applications in the normal security zone in response to initiating the application within the trusted security zone;
receiving a second message comprise the trust zone access control address and data;
internally providing the second message to the trusted security zone based on the trust zone access control address in the second message while the application is executing in the trusted security zone;
processing the data in the second message within the trusted security zone;
performing an action within the trusted security zone based on processing the data; and
providing a third message to the external device from a second application executing in the trusted security zone, wherein the third message comprises information indicating that the second massage was routed to the trusted security zone.

12. The method of claim 11, wherein the message received at the computing device is encapsulated using one or more tokens or encryption keys.

13. The method of claim 11, wherein the computing device comprises a modem, wherein the message is received by the modem, and wherein internally providing the message to the trusted security zone comprises:
extracting the trust zone access control address from the message, and internally routing the message to the trusted security zone using the extracted trust zone access control address.

14. The method of claim 11, wherein performing the action within the trusted security zone comprises at least one of:
provisioning a new application in the trusted security zone, changing a setting in the trusted security zone, storing information in the trusted security zone, restoring information in the trusted security zone, replacing information in the trusted security zone, or removing information from the trusted security zone.

15. A computing device comprising:

a modem;

a processor, wherein the processor comprises a trusted security zone and a normal security zone, wherein the trusted security zone provides hardware assisted security;

a memory comprising non-transitory storage;

a trusted security zone application stored in the memory, that upon execution on the processor, configures at least the processor to:

block access by other applications executing in the normal security zone of the processor from accessing the memory, reading inputs, and writing outputs while the trusted security zone application executes in the trusted security zone, accept a massage comprising a trust zone access control address from a source external to the computing device, wherein the trust zone access control address is not discoverable from the computing device, process the massage within the trusted security zone, and change information within the trusted security zone based on processing the massage within the trusted security zone; and the trust zone access control address encoded into at least one of the trusted security zone of the processor or a secure partition in the memory, wherein the trust zone access control address is unique to the at least one of the trusted security zone of the processor or the secure partition in the memory; and a first application stored in the memory, that upon execution by the processor, configures at least the processor to:

receive a second massage from the source external to the computing device, invoke the first application in response to reception of the massage, wherein the first application executes in the trusted security zone, and provide a response massage to the source subsequent to invocation of the trusted security zone, wherein the response massage comprises information that indicates that the information within the trusted security zone changed after the massage comprising the trust zone access control address is accepted.

16. The device of claim 15, further comprising:

a plurality of processors, wherein each processor of the plurality of processors comprises a trusted security zone and a normal security zone; and a plurality of trust zone access control addresses, wherein each trust zone access control address of the plurality of trust zone access control addresses is encoded in a corresponding processor of the plurality of processors.

17. The device of claim 15, wherein the trust zone access control address is not capable of being changed.

18. The device of claim 15, wherein the modem is configured to route a message received at the modem to the trusted security zone using the trust zone access control address contained in the message.

19. The device of claim 15, wherein the trusted security zone application configures the processor to change the information within the trusted security zone by at least one of: provisioning a new application in the trusted security zone, changing a setting in the trusted security zone, storing information in the trusted security zone based on the trust zone access control address, restoring one or more components from the trusted security zone, replacing one or more components from the trusted security zone, or removing one or more components from the trusted security zone.

* * * * *